United States Patent
Yamazaki et al.

(10) Patent No.: US 6,568,819 B1
(45) Date of Patent: *May 27, 2003

(54) GUIDE PLATE, SURFACE LIGHT SOURCE DEVICE OF SIDE LIGHT TYPE AND LIQUID CRYSTAL DISPLAY

(75) Inventors: Hiroshi Yamazaki, Higashimatsuyama (JP); Shingo Ohkawa, Koshigaya (JP)

(73) Assignees: Enplas Corporation, Kawaguchi (JP); Yasuhiro Koike, Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,021

(22) Filed: Jul. 16, 1999

(30) Foreign Application Priority Data

| Jul. 17, 1998 | (JP) | 10-202466 |
| Aug. 7, 1998 | (JP) | 10-224150 |

(51) Int. Cl.⁷ ................................................. F21V 7/04
(52) U.S. Cl. ............................ 362/31; 362/26; 362/330; 362/335; 362/339; 349/64; 349/65
(58) Field of Search ........................ 362/31, 27, 26, 362/561, 330, 335, 339; 349/62, 64, 65; 359/619, 621

(56) References Cited

U.S. PATENT DOCUMENTS 5,926,033 A * 7/1999 Saigo et al. .................. 326/31
5,997,148 A * 12/1999 Ohkawa ...................... 362/31

FOREIGN PATENT DOCUMENTS

| CN | 325524 | 1/1998 | ................. 24/712.4 |
| CN | 331593 | 5/1998 | ................. 180/447 |

* cited by examiner

Primary Examiner—Sandra O'Shea
Assistant Examiner—Bertrand Zeade
(74) Attorney, Agent, or Firm—Staas & Halsey LLP

(57) ABSTRACT

A guide plate having an emission face for light-output, a back face and an incidence end face for light-input is improved. The emission face is provided with a plurality of projections each of which includes a blunt top portion. The projections have shapes such as like domes or like ridges. Each dome-like projection has a diameter ranging, for example, from 50 $\mu$m to 200 $\mu$m and has a height ranging, for example, from 0.1 $\mu$m to 50 $\mu$m. The dome-like projections distribute with density such that one or more projections are allocated, for example, per box of 0.5 mm×0.5 mm. Ridge-like projections run so as to have a crossing angle, for example, 60 degrees or more with respect to the incidence end face. Ratio of repetition pitch of the ridge-like projections to their height falls within a range, for example, from 5000:1 to 1:1. Height of each ridge-like projection may fall within a range from 1 $\mu$m to 100 $\mu$m. The emission face may be further provided with light scattering pattern consisting of a plurality of scattering elements to scatter illumination light. The improved guide plate is employed in a surface light source device of side light type. The surface light source device may be applied to a LCD having a LCD panel, which is illuminated by the light source device.

27 Claims, 12 Drawing Sheets

LCD (SURFACE LIGHT SOURCE DEVICE OF SIDE LIGHT TYPE 11 + LCD PANEL LP)

LCD (SURFACE LIGHT SOURCE DEVICE OF SIDE LIGHT TYPE 41 + LCD PANEL LP)

GUIDE PLATE, SURFACE LIGHT SOURCE DEVICE OF SIDE LIGHT TYPE AND LIQUID CRYSTAL DISPLAY

BACKGROUND

1. Field of Invention

The present invention relates to a guide plate, a surface light source device of side light type and a liquid crystal display; in particular, the invention relates to a guide plate improved so as to prevent sheet members such as prism sheet from sticking to an emission face of the guide plate, and still relates to a surface light source device of side light type as well as to a liquid crystal display (LCD) which employs the improved guide plate.

2. Related Art

It is a well-known technique to apply a surface light source device of side light type to devices such as LCD comprising a LCD panel illuminated by the light source device. This arrangement is suitable for thinning the overall shape.

The surface light source device of side light type comprises generally a rod-shaped light source such as fluorescent lamp as primary light source, which is disposed besides a guide plate (plate-like guide). Illumination light emitted from the primary light is introduced into the guide plate through an end face (incidence end face). Thus introduced light propagates within the guide plate and brings meanwhile emission from a major face (emission face) of the guide plate toward the LCD panel.

Known guide plates which are employable in surface light source devices of side light type includes ones having substantially uniform thickness and others having tendency to decrease thickness according to distance from a primary light source. In general, the latter emits illumination light more effectively than the former.

It is well known that various sorts of sheet members are employed to be arranged along an emission face of a guide plate. A prism sheet being arranged, emission directivity of the guide plate is corrected. A light diffusion sheet may be arranged in order to scatter emission from the guide plate weakly so that various processed portions of the guide plate are hardly conspicuous.

These sheet members are apt to stick to the emission face because of factors such as static electricity. In particular, a case such that a prism sheet is disposed on an emission face will lead to a serious problem. The problem is illustrated in FIGS. 13 through 15.

In general, sticking of a prism, sheet occurs so that some parts of the sheet contact adhesively with the emission face. Thus a resultant condition will involve a state as illustrated in FIG. 13 and another state as illustrated in FIG. 15. In the former state, tops of projections 1A of a prism sheet 1 stands apart from an emission face 2 of a guide plate 2, with an air layer being interposed. Accordingly, this state provides no light path which leads to the projections 1A from the guide plate 2 directly without passing through the air layer.

On the other hand, in the latter state, tops of projections 1A of the prism sheet 1 contact with the emission face 2 of the guide plate 2. Accordingly, this state provides a lot of light paths which lead to the projections 1A from the guide plate 2 directly without passing through the air layer. Illumination light going on such paths will produce local high brightness portions on an outer face of the prism sheet 1.

This causes bright-dark pattern M to appears and to be visible from the outside of the prism sheet 1 as illustrated in FIG. 13. It is needless to say that such bright-dark pattern reduces quality of illumination. Further, application to backlight in LCDs leads doubtlessly to reduction in quality of display.

OBJECT AND SUMMARY OF INVENTION

The present invention has been proposed under the above described background. An object of the present invention is to provide a guide plate improved so that a sheet member such as prism sheet does not stick to an emission face. Another object of the present invention is to provide a surface light source device of side light type employing the improved guide plate to avoid quality of illumination from being reduced. And still another object of the present invention is to provide a liquid crystal display employing the improved surface light source device of side light type to avoid quality of display from being reduced.

First, the present invention is to be applied to a guide plate comprising an emission face for light-output, a back face and an incidence end face for light-input. According to a fundamental feature, the emission face is provided with a plurality of projections each of which includes a blunt top portion. The improved guide plate prevents a sheet member such as a prism sheet disposed on an emission face from sticking and avoids the sheet member from being damaged.

According to a typical embodiment, the projections are domed. The dome-like shape is featured by being provided with a blunt top portion. Each dome-like projection has a diameter preferably falling within a range from 50 $\mu$m to 200 $\mu$m and has a height preferably falling within a range from 0.1 $\mu$m to 50 $\mu$m. The dome-like projections distribute preferable with density such that at least one projection is allocated per box of 0.5 mm×0.5 mm.

According to another typical embodiment, ridge-like projections each of which includes a blunt ridge-top portion are employed. Each of the ridge-like projections runs crosswise with respect to the incidence end face. Whereas a preferable crossing angle is not less than 60 degrees, a typical crossing angle is 90 degrees, Ratio of repetition pitch of the ridge-like projections to their height preferably falls within a range from 5000:1 to 1:1. And height of each ridge-like projection preferably falls within a range from 1 $\mu$m to 100 $\mu$m.

In every embodiment, the emission face may be further provided with light scattering pattern consisting of a plurality of light diffusion elements to scatter illumination light. Such scattering pattern not only promotes emission from the emission face but also additionally prevents the sheet member from sticking.

The present invention is also to be applied to a surface light source device of side light type including a primary light source, a guide plate supplied with light from the primary light source and a sheet-like member, the id guide plate comprising an emission face for light-output on which the sheet-like member is disposed, a back face and an incidence end face for light-input. The aforesaid improved guide is employed. Thus employed guide plate allows the above embodied styles, enabling accordingly a sheet member such as a prism sheet disposed on an emission face to avoid sticking and damage. As a result, reduction in quality of illumination is avoided.

Further, the present invention is to be applied to a liquid crystal display including a liquid crystal display panel and a surface light source device of side light type to illuminate the panel. It should be noted that the above improved surface light source device of side light type is employed for illuminating the LCD panel. This surface light source device of side light type employs the above guide plate which allows the above embodied styles, enabling accordingly a sheet member such as a prism sheet disposed on an emission face to avoid sticking and damage. As a result, reduction in display quality of the LCD is avoided.

The present invention is further described in detail with referring to the accompanied drawings. It is to be noted that the drawings contain some exaggerated illustration for the sake of easy understanding.

EMBODIMENTS (1) First Embodiment

Figure 2:
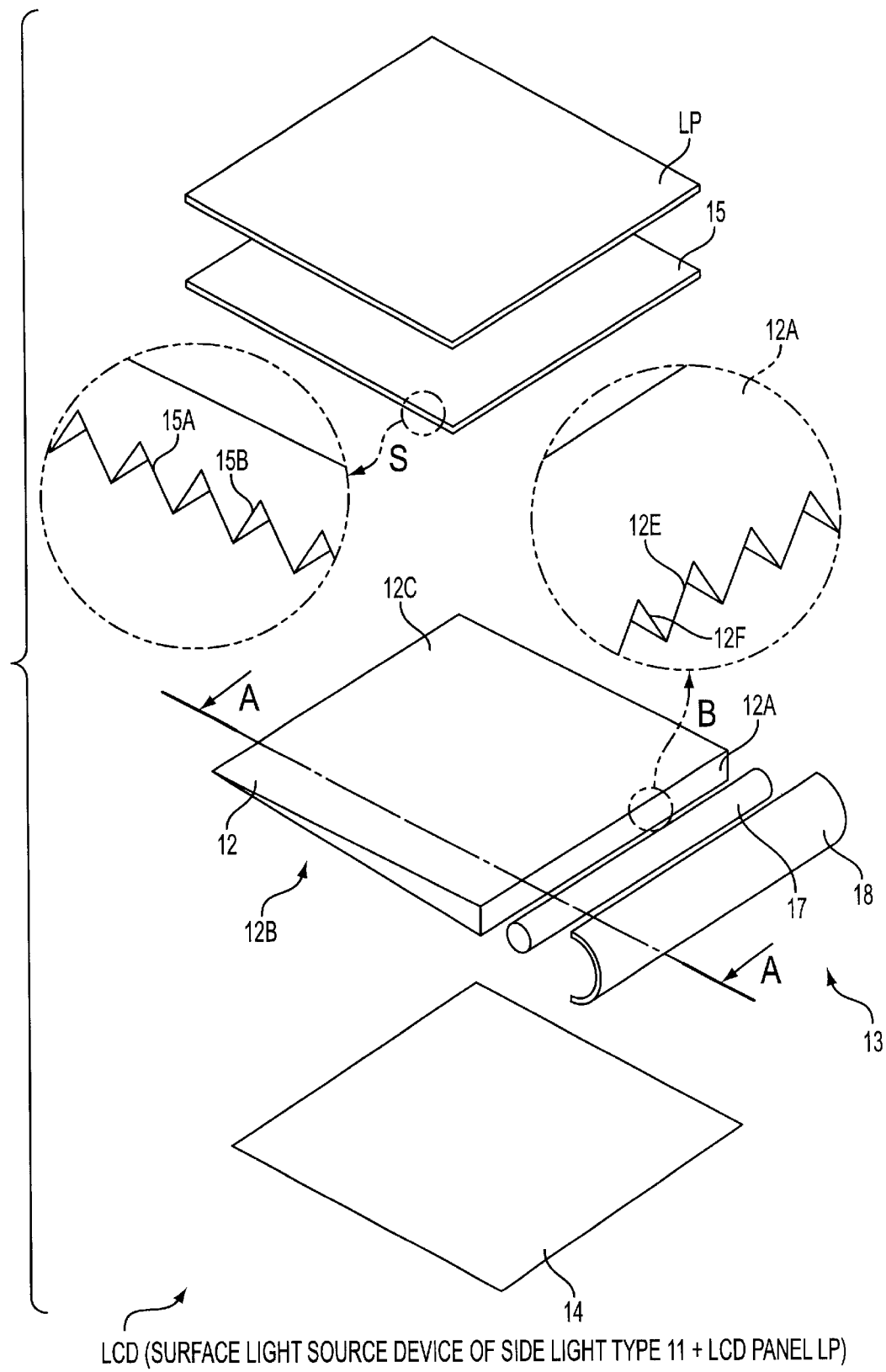
FIG. 2 is an exploded perspective view of a LCD in accordance with the first embodiment of the present invention.

Referring to FIG. 2, a liquid crystal display employs a surface light source device of side light type 11 for back-lighting of a liquid crystal display panel LP. The surface light source device 11 comprises a guide plate 12, a rod-like fluorescent lamp 17, a reflector 18, a reflection sheet 14 and a prism sheet 15 as a light control member. The reflection sheet 14, the guide plate 12 and the prism sheet 15 are laminatedly arranged and fixed by means of a frame member (not shown).

The guide plate 12 is made of, for example, a transparent material such as acrylic resin. The guide plate 12 has an emission face and a back face as major faces. The back face 12B provides a prism face (light control face), as depicted in a partially enlarged illustration with arrow B.

The reflection sheet 14 is a regular-reflection member such as provided with evaporation-deposited silver or an irregular-reflection member such as made of white PET (polyethylene terephthalate). The reflection sheet 14 returns illumination light leaking through the back face 12B of the guide plate 12 into the guide plate 12, thereby avoiding loss.

The prism face is provided with a great number of fine projections running perpendicularly to an incidence end face 12A. Each projection has a shape such that a pair of slopes 12E, 12F are connected to each other. On the other hand, the emission face 12C of the guide plate 12 has a surface shape featured in accordance with the present invention, as described later.

The prism face provided by the back face 12B in this example has a prismatic vertical angle of about 100 degrees. In general, the vertical angle falls within a practical range from 50 degrees to 130 degrees. As well known, such a prism face increases quantity of light which is emitted from the emission face 12C to a frontal direction regarding in a plane parallel with the incidence end face 12A.

The prism sheet 15 has a prism face (light control face) directed to the guide plate 12, as depicted in a partially enlarged illustration with arrow S. The prism sheet 15 is made of, for example, a transparent PET and acrylic resin (such as UV-ray-setting resin).

Each of fine projections on the prism face runs approximately parallel with the incidence end face 12A. Each pair of slopes 15A, 15B of the fine projections has a prismatic vertical angle falling within a practical range from about 30 degrees to about 70 degrees. Repetition pitch of the fine projections is, for example, about 30 μm. It is to be noted that slopes 15A and 15B may have different inclination angles (so-called asymmetric prism sheet).

As well known, such arrangement of prism sheet 15 corrects directivity of illumination light regarding in a plane perpendicular to the incidence end face 12A. In typical cases, the correction is such that quantity of light directed to a frontal direction of the emission face 12C is increased. As shown in FIG. 2, the LCD panel LP is arranged at the outside of the prism sheet 15 to be supplied with illumination output of the surface light source device 11.

Figure 1:
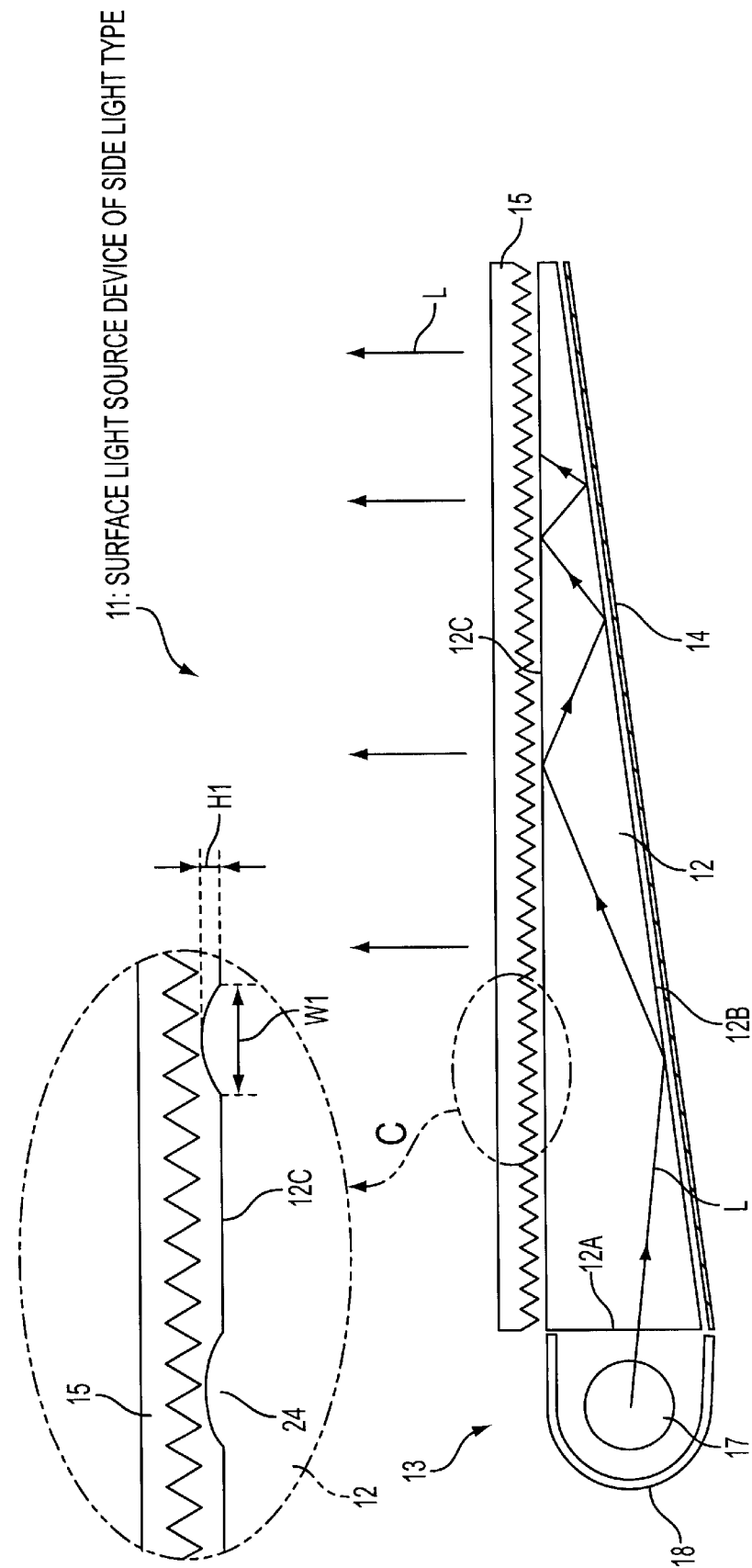
FIG. 1 is a cross sectional view of a surface light source device of side light type which is employed in a first embodiment of the present invention for illuminating a LCD panel.

Next description is focused upon the guide plate 12 featured in accordance with the present invention. The emission face 12C of the guide plate 12 is provided with a great number of dome-like projections 24, as depicted in a partially enlarged illustration in FIG. 1 with arrow C. Each projection has a blunt top portion. In particular, each projection 24 has preferably a hill-like shape which is sloped gently overall as illustrated. And each projection 24 has a generally circular cross section.

Figure 13:
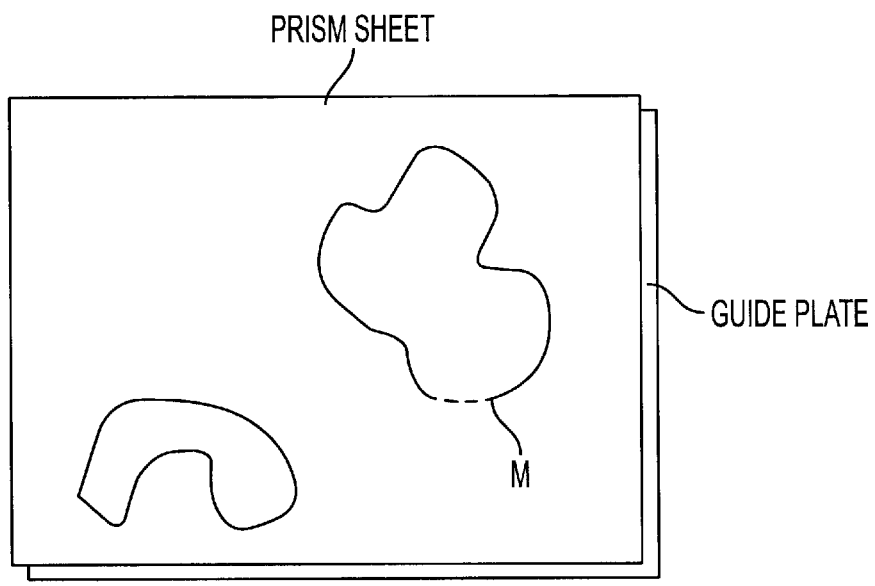
FIG. 13 is a diagram to illustrate disturbance of brightness distribution caused by sticking of prism sheet.
Figure 14:
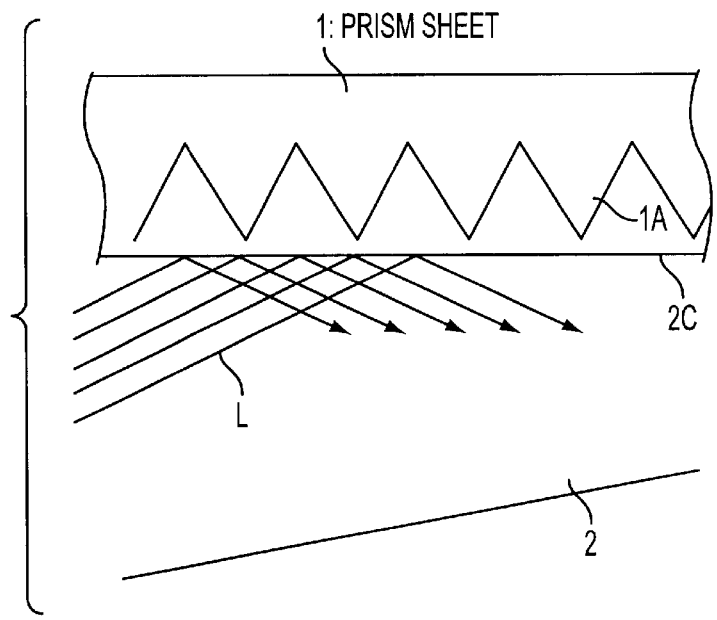
FIG. 14 is a cross sectional diagram to illustrate light paths under a condition such that an air layer is interposed between a prism sheet and an emission face.
Figure 15:
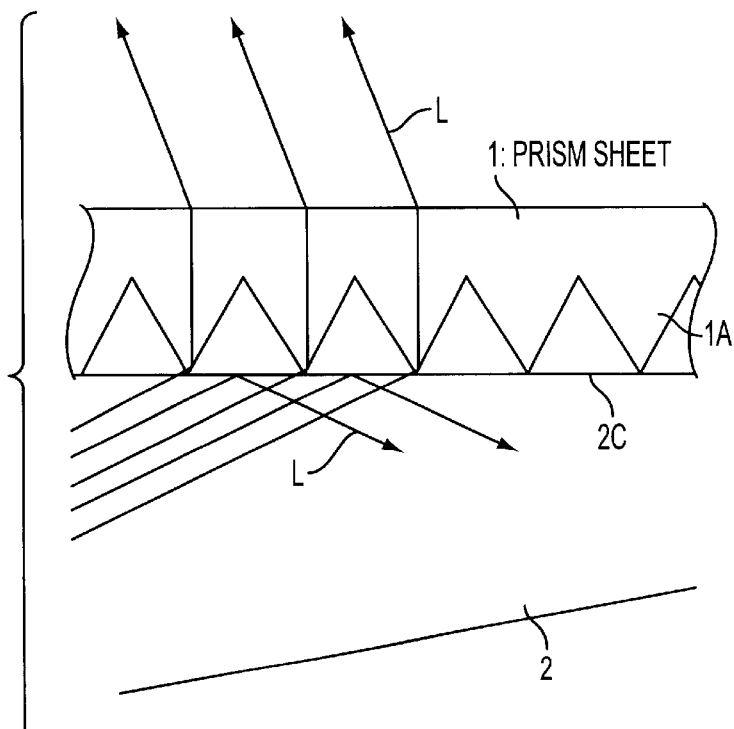
FIG. 15 is a cross sectional diagram to illustrate light paths under a condition such that the prism sheet has an adhesive contact with the emission face.

The projections 24 have a first function such that the prism sheet 15 is supported at point-like regions to provide an air gap corresponding to height H1. This prevents the prism sheet 15 from sticking to the emission face 12C. As a result, such undesirable bright-dark pattern M as shown in FIG. 13 does not appear, enabling the surface light source device to avoid reduction of illumination quality. And accordingly, the LCD is able to avoid reduction of display quality.

It is to be noted that the prism sheet 15 is hardly damaged because the projections 24 have blunt top portions. This is particularly striking if each projection 24 is formed like a hill which is sloped gently overall.

Since the projections 24 prevent the prism sheet 15 from sticking through supporting the sheet at point-like regions, it is preferable that every projection 24 contacts with at least one top portion of prism component (projection of the prism sheet 15). Accordingly, it is preferable that diameter W1 is from about one to about 4 times as large as repetition pitch of the prism components (projections of the prism sheet 15) and falls within a range, for example, from 50 μm to 200 μm. Diameter W1 is allowed to have uneven values. In this embodiment, the average of diameter W1 is about 100 μm.

In general, height H1 is required to be enough to support the prism sheet 15, with the air layer being interposed. The optimum value of height H1 is preferably determined depending on distribution density of projections 24 and on unevenness of height H1. Height H1 is allowed to have uneven values and a practical range from 0.1 μm to 50 μm. In this embodiment, the average of height H1 is about 10 μm.

Density (number per unit area) of projections 24 preferably avoid having an excessively small value-in order to ensure the air gap. A desirable density is such that at least one is allotted per box of 0.5×0.5 mm.

The projections 24 have a second function such that they provide surfaces at which the critical angle condition is easily passed and thereby promote emission from the surfaces. Accordingly, if the projections 24 are distributed at a relatively high density in an area where reduction in brightness is apt to occur, brightness will be uniformalized over the emission face 12C.

Wedge-shaped guide plates as employed in this embodiment, tend to provide brightness which increases according to distance from the incidence end face 12A. To allow for this, the projections are formed so that density (number per unit area) decreases gradually according to distance from the incidence end face 12A as illustrated in FIG. 3.

Figure 3:
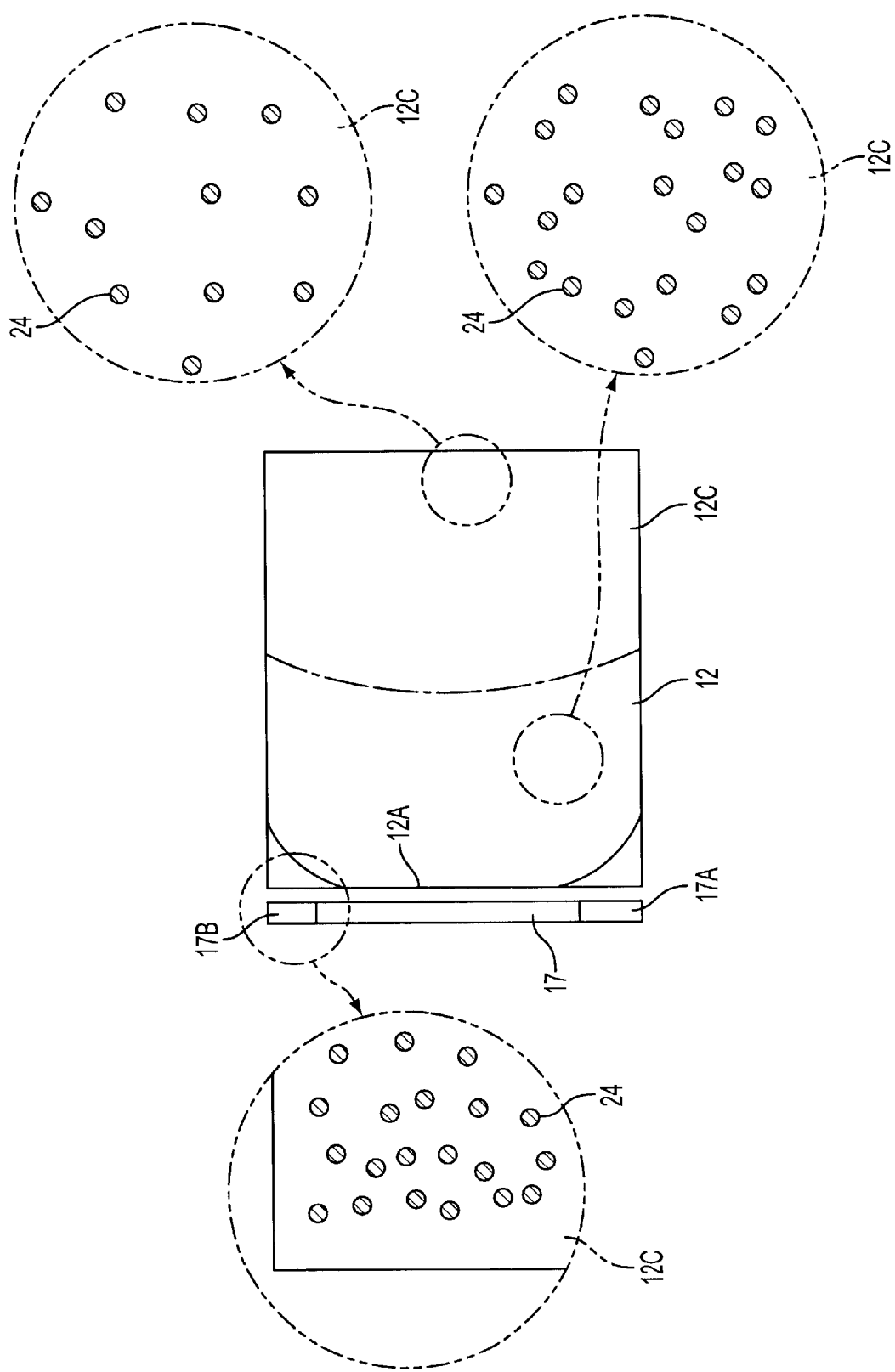
FIG. 3 is a plan view of an emission face of a guide plate which is employed in the light source device shown in FIG. 1.

Besides, reduction in brightness tends to occur, in particular, around corners which are opposing to electrode 17A, 17B of the fluorescent lamp 17 in FIG. 3. To overcome such situation, density increases according to distance from a central portion regarding in a direction along the incidence end face 12A.

The projections 24 are preferably arranged with irregularity as shown in FIG. 3. Arrangements with high regularity tend to make the projections visible. And, in general, the larger the ratio of W1 to height H1 is, the more strikingly emission of illumination light L is promoted. Values such as H1 and W1 are preferably designed under taking into account this.

The projections 24 may be manufactured through plastic molding technique (such as injection molding) employing a mold provided with locally processed portions which correspond to locations at which the projections 24 are to be formed.

Illumination light emitted from the fluorescent lamp 17 is introduced into the guide plate 12, directly or after being reflected by the reflector 18, through the incidence end face 12A. The introduced illumination light propagates within the guide plate 12 with repetition of reflections by the emission face 12C and by the back face 12B.

Incidence angle with respect to the emission face 12C decreases after every reflection by the back face 12B. Components which have angles not larger than the critical angle with respect to the emission face 12C are emitted from the emission face 12C. Illumination light leaking through the back face 12B is returned into the guide plate 12 by the reflection sheet 14.

The dome-like projections 24 provide portions where emission from the emission face 12C is promoted. Emission intensity (brightness) is uniformalized under distribution density as shown in FIG. 3. And high-grade illumination light is supplied to the LCD panel LP at approximately vertical angle after being subject to the aforesaid directivity correction effects by the back face 12B and the prism sheet 15.

As compared with such techniques as promote emission through roughening of emission face, the present technique employing the dome-like projections 24 to promote emission is more advantageous. The roughening technique tends to bring fine bright-dark repetition or less smooth look on the emission face 12C because roughened regions and the rest regions form a microscopic repetition pattern.

To the contrary, the present technique employing blunt dome-like projections 24 hardly suffers from such fine bright-dark repetition and less smooth look of the emission face.

Besides, another advantage is derivatively obtained from prevention of sticking of sheet members such as prism sheet. Foreign matters such as dust are occasionally caught between a sheet member and the emission face 12C at assembling of surface light source devices 11 or liquid crystal displays. Avoidance of sticking reduces load which would be required for removing the foreign matters.

(2) Second Embodiment

Figure 4:
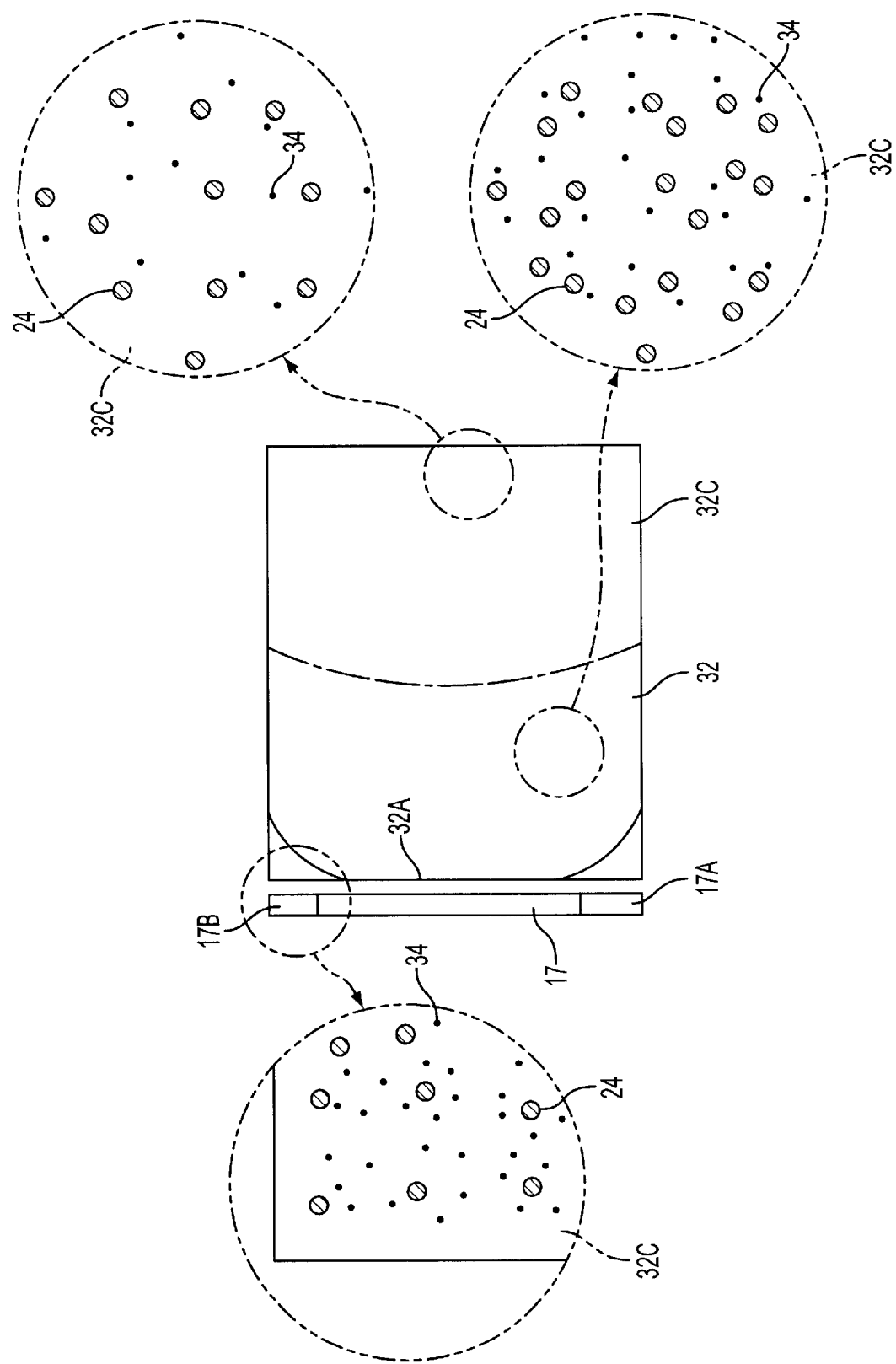
FIG. 4 is a plan view of an emission face of a guide plate which is employed in a second embodiment.

This embodiment is different from the first embodiment in that a scattering guide plate 32 as shown in FIG. 4 is employed instead of the guide plate 12. The other matters include nothing different in particular. Accordingly, description of the second embodiment is focused on features of the scattering guide plate 32.

The scattering guide plate 32 is a guide plate which has scattering power inside and is composed of, for example, matrix made of polymethylmethacrylate (PMMA) and light-permeable particles dispersed uniformly in the matrix. The light-permeable particles have refractive index different, from that of the matrix, thereby being provided with inside scattering power.

The scattering guide plate 32 also has a wedge-shaped cross section. Such wedge-shaped cross section and inside scattering power help emission from an emission face 32C. A back face provides a prism face formed in the same manner as the case of the guide plate 12.

In the same manner as in the case of the first embodiment, a great number of dome-like projections 24 are formed on the emission face 32C. Density (number per unit area) of projections 24 is approximately uniform over the emission face 32C. However, their arrangement is preferably provided with irregularity, as illustrated. Arrangements with high regularity tend to make the projections 24 visible.

Figure 5:
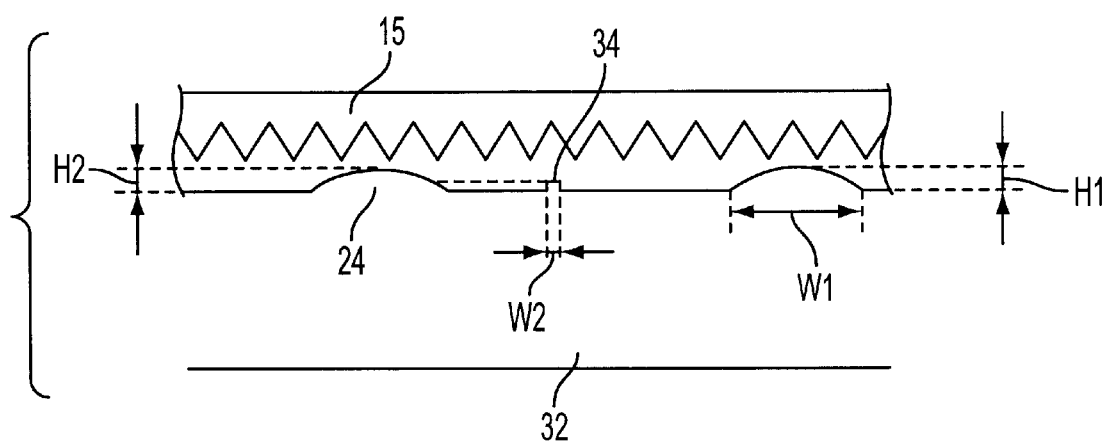
FIG. 5 is a partially enlarged cross sectional diagram to illustrate functions of the emission face of the guide plate shown in FIG. 4.

Each projection 24 has functions, a shape, size and so on which are generally the same as those in the case of the first embodiment. As illustrated in FIG. 5, In particular, each projection 24 has preferably a hill-like shape which is sloped. gently overall as illustrated. And each projection 24 has a generally circular cross section.

The projections 24 support a sheet-like member such as prism sheet at point-like regions to hold an air gap. This prevents the sheet-like member from sticking to the emission face 32C. As a result, the surface light source device can avoid reduction of illumination quality. And accordingly, the LCD is able to avoid reduction of display quality. Since the top portions of the projections are blunt, the sheet-like member such as prism sheet is hardly damaged.

It is preferable that every projection 24 contacts with at least one top portion of prism component (projection of a prism sheet). Diameter WI preferably falls within a range, for example, from 50 $\mu$m to 200 $\mu$m. In this embodiment, diameter W1 is about 100 $\mu$m.

In general, height H1 of the projections 24 falls within a range from 0.1 $\mu$m to 50 $\mu$m. The average of height H1 is, for example, about 10 $\mu$(number per unit area) is preferably such that at least one is allotted per box of 0.5×0.5 mm. However, it is be noted that the projections 24 may be formed with the smallest density required because this embodiment employs a light scattering pattern together with the projections as described next.

A feature of the present embodiment is that a great number of light diffusion elements 34 consisting of fine roughened regions are formed together with the projections 24. The light diffusion elements 34 are dot-like-circular individually and distribute to form a designed light scattering pattern. As well known, emission is promoted by the light diffusion elements 34.

In this embodiment, the light diffusion elements 34 are formed at a relatively high density in a region where brightness is apt to be short, thereby uniformalizing brightness over the emission face 32C.

That is, as shown in FIG. 4, the light diffusion elements 34 are formed so that density decreases gradually according to distance from an incidence end face 32A. Besides, reduction in brightness tends to occur, in particular, around corners which are opposing to the electrode 17A, 17B of the fluorescent lamp 17 in FIG. 4. To overcome such situation, density increases according to distance from a central portion regarding in a direction along the incidence end face 32A.

As illustrated in FIG. 5, each light diffusing element 34 has diameter W2 which is smaller than those of the projections, thereby making the elements hardly visible. In this embodiment, W2 is 35 $\mu$m. And height H2 (depth of unevenness) is about 2 $\mu$m. In general, if W2 is greater than 80 $\mu$m, the elements are apt to visible. Preferably, W2 is not greater than 50 $\mu$m, in particular, than 25 $\mu$m.

(3) Modifications of First and Second Embodiments

The above-described first and second embodiments put no limitation on the scope of the present invention. For instance, the following modifications are permitted.

(a) Projections 24 may have other shapes in so far as their top portions are blunt. For example, projections like circular truncated cones may be employed. Column-like projections having semi-sphere-like top portions are also employable.

(b) The projections 24 may have cross section shapes other than circles, for example, ellipses. The light diffusion elements 34 may have shapes other than dot-like-circles, for example, dot-like-ellipses or dot-like-rectangulars.

(c) The above first embodiment employs a transparent guide plate while the above second embodiment employs a scattering guide plate. This is limitative to the scope of the present invention by no means. For example, light scattering pattern and dome-like projections may be formed together on an emission face of a transparent guide plate. Alternatively, dome-like projections may be formed on an emission face of a scattering guide plate without forming light scattering pattern.

(d) A sheet-like member other than prism sheet, for example, a light diffusion sheet, may be disposed on an emission face. And needless to say, the present invention is applicable to cases where a plurality of sheet-like members are disposed on an emission face.

(e) An employable guide plate has a back face which provides no prism face. For example, the back face may be partially or overall roughened.

(f) Light diffusion elements 34 may be arranged with regularity unless conspicuous Moire fringes appear.

(g) The size of light diffusion elements 34 employed in the above embodiments puts no limitation on the present invention. For example, if a diffusion sheet with remarkably large scattering power is disposed at the outside of the emission face, such sizes as greater than 80 $\mu$m will be allowed.

(h) Guide plates having shapes other than wedge-shape may be employed. For instance, a guide plate having a generally uniform thickness may be employed.

(i) The present invention allows an employed guide plate to provide two or more incidence end faces. And correspondingly, a plurality of primary light sources my be arranged.

(j) The present invention allows an employed primary light source to comprise a light source element other than a rod-shaped light source like a fluorescent lamp.

(k) Surface light source devices in accordance with the present invention may be applied to uses other than backlighting for LCD. For example, the present invention may be broadly applied to various illumination devices or displays.

(4) Third Embodiment

Figure 6:
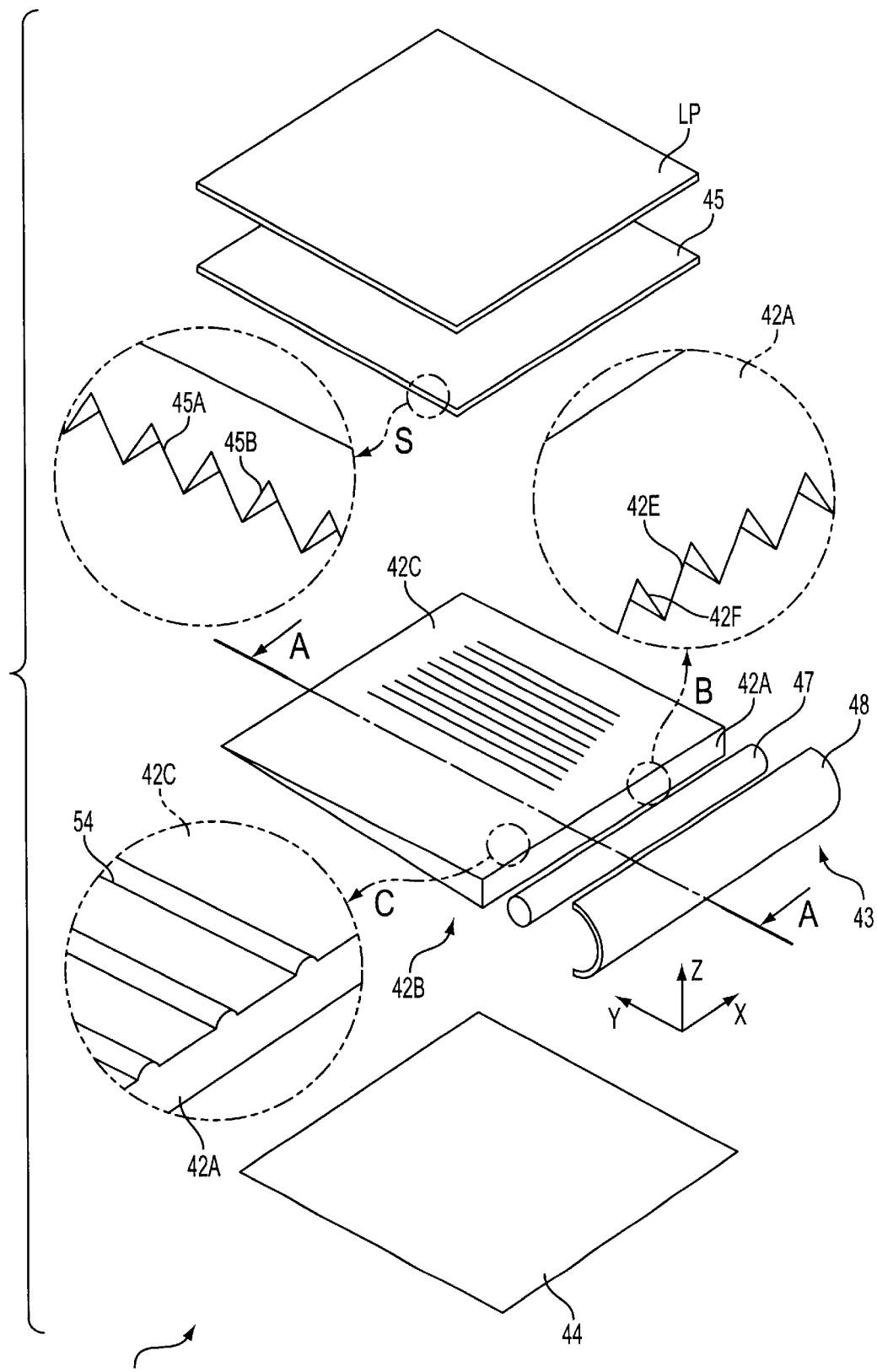
FIG. 6 is an exploded perspective view of a LCD in accordance with a third embodiment of the present invention.

Referring to FIG. 6, a LCD employs a surface light source device of side light type 41 for backlighting a LCD panel LP. The surface light source device 41 has the same structure as that of the surface light source device 11 (first embodiment) except that a guide plate 42 is employed instead of the guide plate 12.

Figure 7:
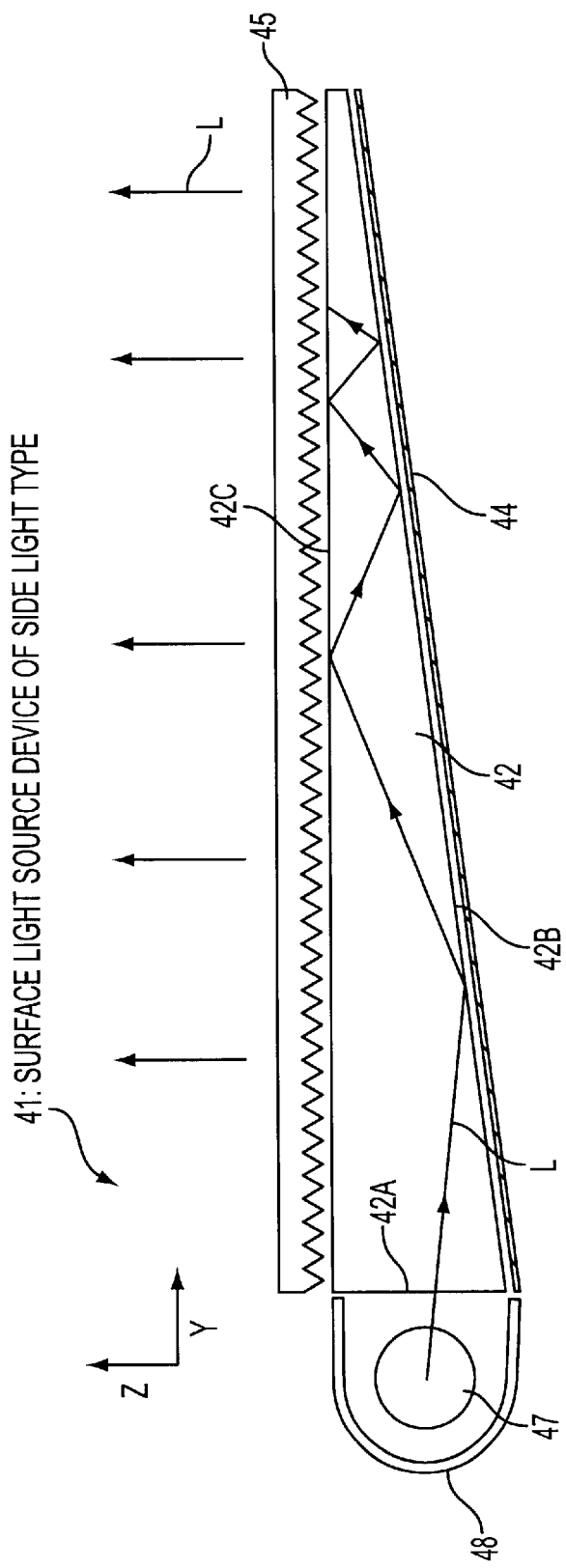
FIG. 7 is a cross sectional view (along line A—A) of a surface light source device which is employed in the LCD shown in FIG. 6.

Referring to FIG. 7 as well as FIG. 6, a surface light source device 41 comprises a rod-shaped fluorescent lamp 47, a reflector 48, a reflection sheet 44 and a prism sheet 45 as a light control member. The reflection sheet 14, the guide plate 42 and the prism sheet 45 are laminatedly arranged and fixed by means of a frame member (not shown).

The guide plate 42 is made of, for example, a transparent material such as acrylic resin. The guide plate 42 has an emission face 42C and a back face 42B as major faces. The reflection sheet 44 is a regular-reflection member such as provided with evaporation-deposited silver or an irregular-reflection member such as made of white PET (polyethylene terephthalate). The reflection sheet 44 returns illumination light leaking through the back face 12B of the guide plate 42 into the guide plate 42, thereby avoiding loss. The back face 42B provides a prism face (light control face), as depicted in a partially enlarged illustration with arrow B.

The prism face is provided with a great number of fine projections running perpendicularly to an incidence end face 42A. Each projection has a shape such that a pair of slopes 42E, 42F are connected to each other. On the other hand, the emission face 42C of the guide plate 42 has a surface shape featured in accordance with the present invention, as described later.

The prism face provided by the back face 42B in this example has a prismatic vertical angle of about 100 degrees. In general, the vertical angle falls within a practical range from 50 degrees to 130 degrees. As well known, such a prism face increases quantity of light which is emitted from the emission face 42C to a frontal direction regarding in a plane parallel with the incidence end face 42A.

The prism sheet 45 has a prism face (light control face) directed to the guide plate 42, as depicted in a partially enlarged illustration with arrow S. The prism sheet 45 is made of, for example, a transparent PET and acrylic resin (such as UV-ray-setting resin).

Each of fine projections on the prism face runs approximately parallel with the incidence end face 42A. Each pair of slopes 45A, 45B of the fine projections has a prismatic vertical angle falling within a practical range from about 30 degrees to about 70 degrees. Repetition pitch of the fine projections is, for example, about 30 µm. It is to be noted that slopes 45A and 45B may have different inclination angles (so-called asymmetric prism sheet).

As well known, such arrangement of prism sheet 45 corrects directivity of illumination light regarding in a plane perpendicular to the incidence end face 42A. In typical cases, the correction is such that quantity of light directed to a frontal direction of the emission face 42C is increased. The LCD panel LP is arranged at the outside of the prism sheet 45 to be supplied with illumination output of the surface light source device 41.

Next description is focused upon the guide plate 42 featured in accordance with the present invention. The emission face 42C of the guide plate 42 is provided with a great number of ridge-like projections (projection rows) 54, as depicted in a partially enlarged illustration in FIG. 6 with arrow C.

Each projection row has a blunt ridge-top portion. In particular, each projection row 54 has preferably a cross section having an overall gentle shape as illustrated. In the illustrated example, each projection row 54 has a constant cross section. In this description, the term "ridge-top portion" is defined as the most raised linear or, in some cases, band-like part of each projection. Each ridge-top portion runs crosswise with respect to the incidence end face 42A. In the illustrated example, crossing angles are about 90 degrees.

Figure 8B:
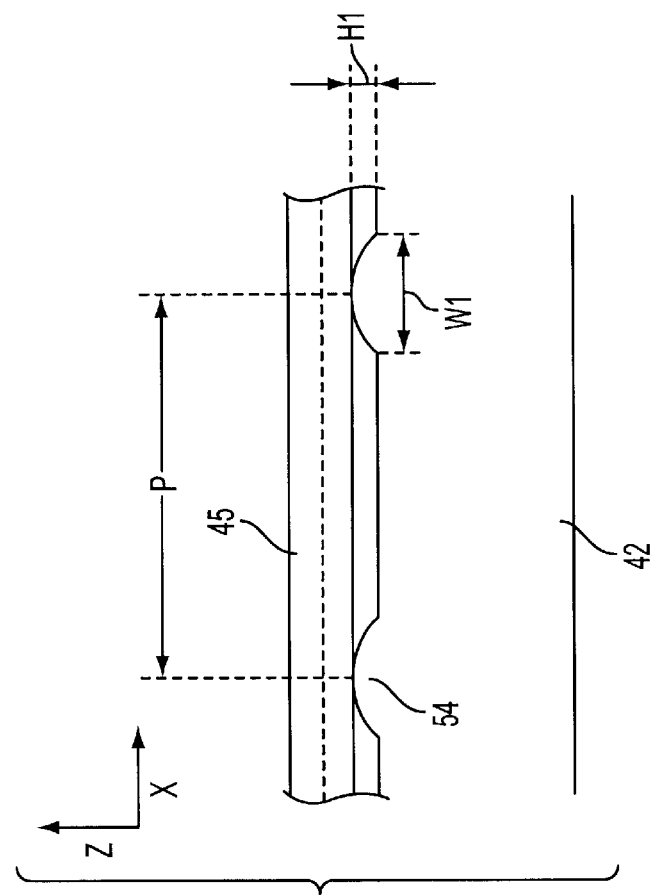
FIG. 8b is a partially enlarged cross sectional diagram pairing with FIG. 8a, the cross section being in parallel with the incidence end face.
Figure 8A:
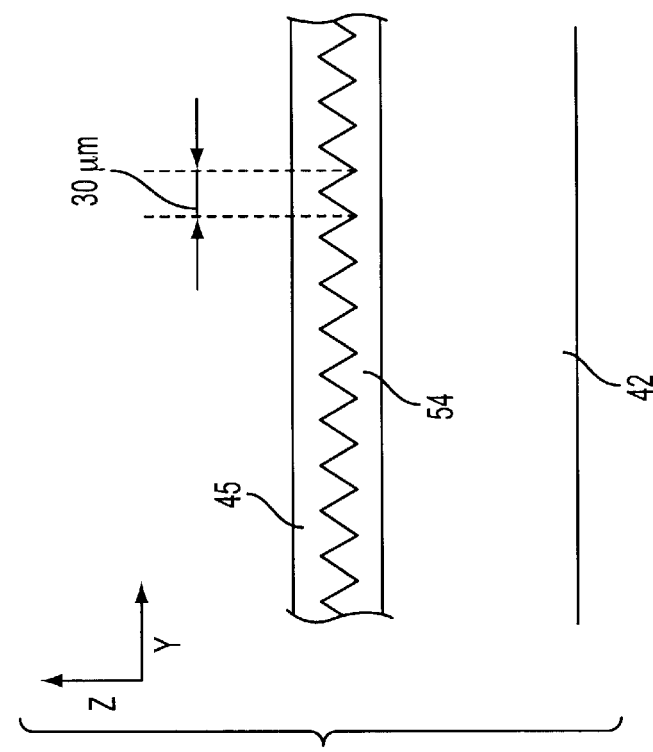
FIG. 8a is a partially enlarged cross sectional diagram to illustrate functions of an emission face of a guide plate employed in the surface light source device shown in FIG. 7, the cross section being along a direction perpendicular to an incidence end face.

The projection rows 54 support the prism sheet 45 at linear regions (including cases of narrow band regions), as illustrated in FIGS. 8a, 8b, to provide an air gap corresponding to height H4. This prevent the prism sheet 45 from sticking to the emission face 42C.

As a result, undesirable bright-dark pattern M as shown in FIG. 13 does not appear and the surface light source device 41 is free from reduction in illumination quality. And accordingly, the LCD is free from reduction in display quality.

It is to be noted that the prism sheet 45 is hardly damaged because the projection rows 54 have blunt ridge-top portions. This is particularly striking if each projection row 54 has a gently shaped cross section. In this embodiment, width W4 of projection row 54 is 50 µm and height H4 is 10 µm. Width W4 or height H4 may have uneven values. Repetition pitch P along the incidence end face 42A is 0.2 mm.

The projection rows 54 provide surfaces at which the critical angle condition is easily passed and thereby bring a tendency to promote emission. Accordingly, brightness distribution of the emission face 42C is influenced by formation of the projection rows 54. However, this influence is not serious insofar as H4 falls within a range from 1 µm to 100 µm and W4 falls within a range from 10 µm to 100 µm. A more preferable range of H4 is 5 µm to 50 µm and W4 falls more preferably within a range from 30 µm to 70 µm.

Whereas the optimum value of pitch P varies depending on H4 and W4, ratio of repetition pitch of the ridge-like projections 54 to their height H4 preferably falls within a range from 5000:1 to 1:1, in particular, from 100:1 to 1:1.

And pitch P further keeps preferably another condition that pitch P is not greater than 5 mm to avoid the prism sheet 45 from being less steadily supported. The The projections 54 may be manufactured through plastic molding technique (such as injection molding) employing a mold provided with locally processed portions which correspond to locations at which the projections 54 are to be formed.

Illumination light emitted from the fluorescent lamp 47 is introduced into the guide plate 42, directly or after being reflected by the reflector 48, through the incidence end face 42A. The introduced illumination light propagates within the guide plate 42 with repetition of reflections by the emission face 42C and by the back face 42 B.

Incidence angle with respect to the emission face 42C decreases after every reflection by the back face 42B. Components which have angles not larger than the critical angle with respect to the emission face 42C are emitted from the emission face 42C. Illumination light leaking through the back face 42B is returned into the guide plate 42 by the reflection sheet 44.

The present embodiment has also another advantage derivatively obtained from prevention of sticking of sheet members such as prism sheet. Foreign matters such as dust are occasionally caught between a sheet member and the emission face 42C at assembling of surface light; source devices 41 or liquid crystal displays. Avoidance of sticking reduces load which would be required for removing the foreign matters.

(5) Forth Embodiment

Figure 9:
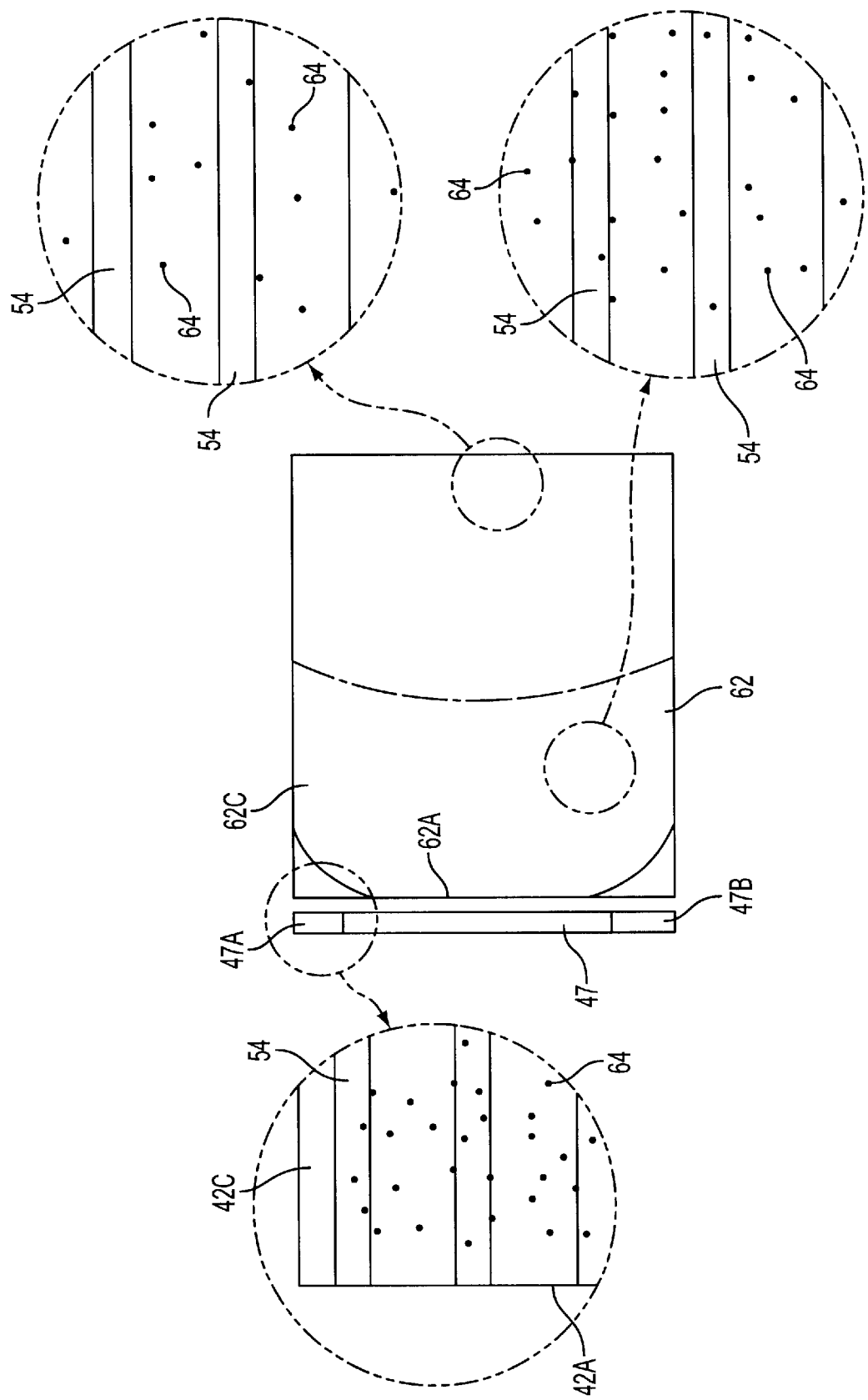
FIG. 9 is a plan view of an emission face of a guide plate which is employed in a forth embodiment.

This embodiment is different from the third embodiment in that a scattering guide plate 62 as shown in FIG. 9 is employed instead of the guide plate 42. The other matters include nothing different in particular. Accordingly, description of the forth embodiment is focused on features of the scattering guide plate 62.

The scattering guide 62 is a guide plate which has scattering power inside and is composed of, for example, matrix made of polymethylmethacrylate (PMMA) and light-permeable particles dispersed uniformly in the matrix. The light-permeable particles have refractive index different from that of the matrix, thereby being provided with inside scattering power.

The scattering guide plate 62 also has a wedge-shaped cross section. Such wedge-shaped cross section and inside scattering power help emission from an emission face 62C. A back face provides a prism face formed in the same manner as the cases of the guide plates 12 and 42.

In the same manner as in the case of the third embodiment, a great number of ridge-like projections 54 are formed on the emission face 62C.

Figure 10:
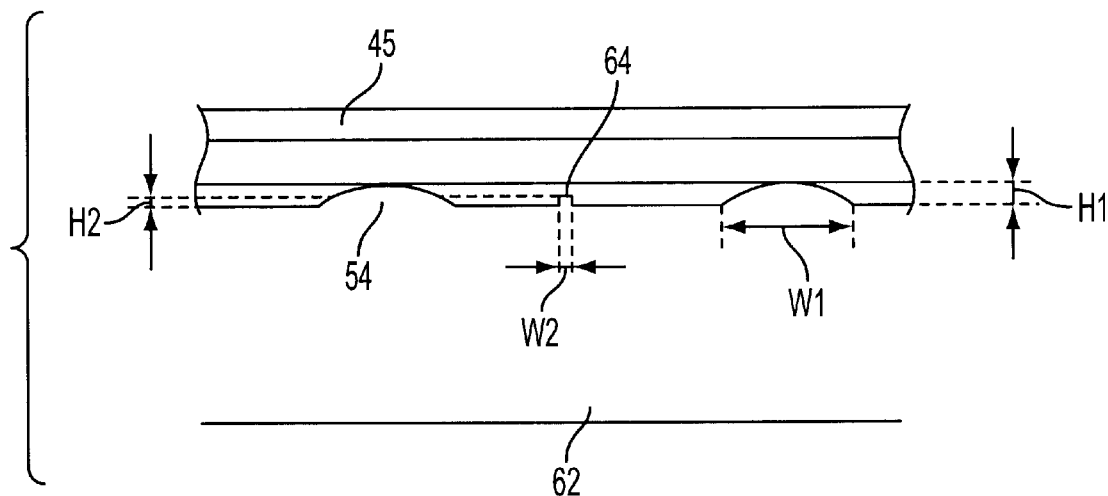
FIG. 10 is a partially enlarged cross sectional diagram to illustrate functions of the emission face of the guide plate shown in FIG. 9.

Individual projection rows 54 may have similar functions, shapes, sizes and the likes to those of the cases of the third embodiment. As shown in FIG. 10, each projection row has a blunt ridge-top portion. In particular, each projection row 54 has preferably a cross section having an overall gentle shape as illustrated.

The projection rows 54 support sheet-like members such as prism sheet at linear regions to maintain an air gap. This prevent the sheet-like members from sticking to the emission face 62C. As a result, the surface light source device is free from reduction in illumination quality. And accordingly, the LCD is free from reduction in display quality. The sheet-like members such as prism sheet are hardly damaged because the projection rows 54 have blunt ridge-top portions.

According to a feature of the present embodiment, a great number of light diffusion elements 64 consisting of fine roughened regions are formed-together with the projection rows 54. The light diffusion elements 64 have circular dot-like shapes individually and distribute to provide a designed light scattering pattern. As well known, such light diffusion elements 64 promote light emission.

In the present embodiment, the light diffusion elements 64 are formed with a relatively high density in areas where brightness is apt to be reduced, thereby uniformizing brightness on the emission face 62C.

That is, as shown in FIG. 9, the light diffusion elements 64 are formed so that density decreases gradually according to distance from an incidence end face 62A. Besides, reduction in brightness tends to occur, in particular, around corners which are opposing to the electrode 47A, 47B of the fluorescent lamp 47 in FIG. 9. To overcome such situation, density increases according to distance from a central portion regarding in a direction along the incidence end face 42A.

As illustrated in FIG. 10, each light diffusing element 64 has diameter W2 which is smaller than width of each projection row 54, thereby making the elements hardly visible. In this embodiment, W2 is 35 μm. And height H2 (depth of unevenness) is about 2 μm. In general, if W2 is greater than 80 μm, the elements are apt to visible. Preferably, W2 is not greater than 50 μm, in particular, than 25 μm.

(6) Modifications of Third-and-Fourth-Embodiments

The above-described third and fourth embodiments put no limitation on the scope of the present invention. For instance, the following modifications are permitted.

(i) Projection rows 54 may have other shapes insofar as the rows have blunt ridge-top portions. For instance, projection rows may have plateau-like ridge-top portions each of which has a trapezoid-like cross section.

(ii) The ridge-top portions of the projection rows may cross obliquely with respect to the incidence end face 12A. However, it should be noted that excessively inclined crossing angles tend to bring linear areas where brightness is too high. In view of this, crossing angle is preferable is not less than 60 degrees. Projection rows may be parallel with one another and may include crossings.

Figure 11:
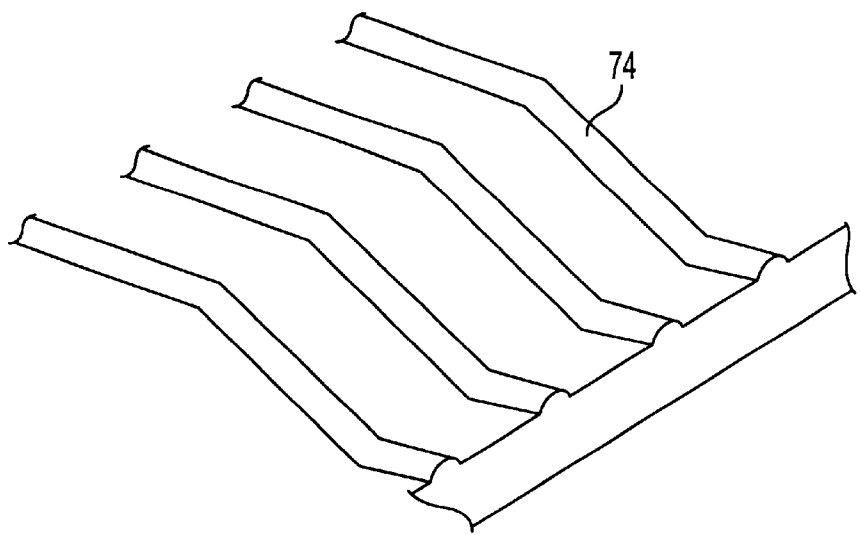
FIG. 11 is a perspective view of a guide plate according to a modified embodiment.

(iii) The projection rows may not arranged in straight lines. An employable zigzag projection rows 74 are shown in FIG. 11. Curved and meandering projection rows may be employed.

(iv) Each projection row is not required to have a constant cross section shape at every portion. For instance, the projection rows may have cross section shapes varying along their running direction.

(v) The projection rows are not required to run across completely a guide plate from its incidence end face to its distal wedge-end. For instance, they run across a part of the whole from the incidence end face to the distal end.

Figure 12:
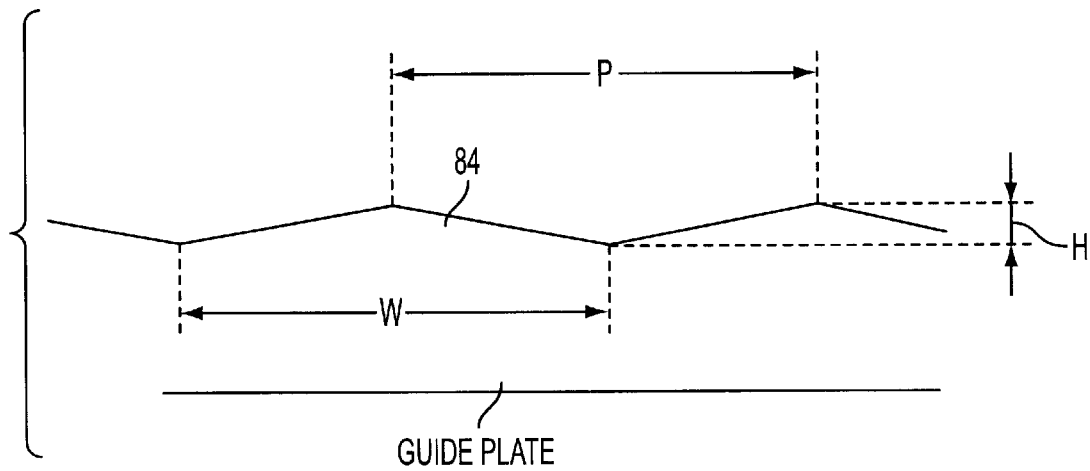
FIG. 12 is a partially enlarged cross sectional diagram to illustrate functions of an emission face of the guide plate shown in FIG. 11.

(vi) In the third and the forth embodiments, the projection rows have width W4 which is smaller than their repetition pitch P. However, as an example shown in FIG. 12, pitch P substantially equal to width W4 is employable.

In this case, inclinations (i.e. inclinations with respect to a general plane on which an emission face extends) of a pair of slopes of each projection row are preferably very gentle. Steep inclinations can have an unexpected influence on emission directivity of the guide plate. In view of this, it is practical to set ratio of pitch P to height H4 within a range from 100:1 to 1:1.

(vii) The guide plate employed in the third embodiment is transparent while the forth embodiment employs a scattering guide plate. This puts no limitation on the present invention.

For example, light scattering pattern may be formed together with projection rows on an emission face of a scattering guide plate. Alternatively, projection rows may be on an emission face of a scattering guide plate without forming light scattering pattern.

(viii) The aforesaid modifications (d) to (j) can be applied to the second and forth embodiments almost without any change.

That is, a sheet-like member other than prism sheet, for example, a light diffusion sheet, may be disposed on an emission face. And a plurality of sheet-like members may be disposed on an emission face.

A guide plate having a back face providing no prism face may be employed. For example, the whole or a part of the back face may provide a rough surface. Insofar as striking Moire fringes do not appear, the light diffusion elements 64 may be arranged with regularity. The sizes of the light diffusion elements 64 employed in the embodiments put no limitation on the present invention. For example, if a diffusion sheet with remarkably large scattering power is disposed at the outside of the emission face, sizes greater than 80 μm may be employed.

Guide plates having shapes other than wedge-shape may be employed. For instance, a guide plate having a generally uniform thickness may be employed. Guide plates providing two, or more incidence end faces may be employed. And correspondingly, a plurality of primary light sources my be arranged.

A primary light source may comprise a light source element other than a rod-shaped light source like a fluorescent lamp. A plurality of point-like light source elements such as LED may be employed to form a primary light.

And applications to uses other than backlighting for LCD are permitted. For example, broad applications to various illumination devices or displays are possible.

What is claimed is:

1. A guide plate comprising:
   an emission face for light-output;
   a back face; and
   an incidence end face for light-input, wherein said emission face is provided with a plurality of dome-like projections each of which has a circular cross section and includes a blunt top portion, said dome-like projections being distributed discretely and randomly on said emission face.

2. A guide plate according to claim 1, wherein each of said dome-like projections has a diameter falling within a range from 50 μm to 200 μm.

3. A guide plate according to claim 2, wherein each of said dome-like projections has a height falling within a range from 0.1 μm to 50 μm.

4. A guide plate according to claim 2, wherein said dome-like projections distribute with density such that at least one projection is allocated per box of 0.5 mm×0.5 mm.

5. A guide plate according to claim 2, wherein said emission face is further provided with light scattering pattern consisting of a plurality of scattering elements to scatter illumination light.

6. A guide plate comprising:
   an emission face for light-output;
   a back face; and
   an incidence end face for light-input, wherein said emission face is provided with a plurality of ridge-like projections each of which includes a blunt ridge-top portion and runs cross wise with respect to said incidence end face, said blunt ridge-top portion projecting from a portion which covers said emission face throughout except for where said blunt ridge-top portions are provided, wherein
a ratio of a repetition pitch of the ridge-like projections to a height of the ridge-like projections falls within a range of from 5000:1 to 1:1.

7. A guide plate according to claim 6, wherein height of each ridge-like projection falls within a range from 1 μm to 100 μm.

8. A guide plate according to claim 6, wherein each of said ridge-like projections runs so as to have a crossing angle not less than 60 degrees with respect to said incidence end face.

9. A guide plate according to claim 6, wherein said emission face is further provided with light scattering pattern consisting of a plurality of scattering elements to scatter illumination light.

10. A surface light source device of side light type including a primary light source, a guide plate supplied with light from the primary light source and a sheet-like member, said guide plate comprising:
an emission face for light-output on which said sheet-like member is disposed;
a back face; and
an incidence end face for light-input, wherein said emission face is provided with a plurality of dome-like projections being distributed discretely and randomly on said emission face, each of which has a circular cross section and includes a blunt top portion, thereby preventing said sheet like member from sticking to said emission face and from being damaged.

11. A surface light source device of side light type according to claim 10, wherein each of said dome-like projections has a diameter falling within a range from 50 μm to 200 μm.

12. A surface light source device of side light type according to claim 10, wherein each of said dome-like projections has a height falling within a range from 0.1 μm to 50 μm.

13. A surface light source device of side light type according to claim 10, wherein said dome-like projections distribute with density such that at least one projection is allocated per box of 0.5 mm×0.5 mm.

14. A surface light source device of side light type according to claim 10, wherein said emission face is further provided with light scattering pattern consisting of a plurality of scattering elements to scatter illumination light.

15. A surface light source device of side light type including a primary light source, a guide plate supplied with light from the primary light source and a sheet-like member, said guide plate comprising:
an emission face for light-output on which said sheet-like member is disposed;
a back face; and
an incidence end face for light-input, wherein said emission face is provided with a plurality of ridge-like projections each of which includes a blunt ridge-top portion and runs crosswise with respect to said incidence end face, said blunt ridge-top portions projecting from a remainder portion which covers said emission face throughout except for where said blunt ridge-top portions are provided, thereby preventing said sheet like member from sticking to said emission face and from being damaged, wherein
a ratio of a repetition pitch of the ridge-like projections to a height of the ridge-like projections falls within a range of from 5000:1 to 1:1.

16. A surface light source device of side light type according to claim 15, wherein height of each ridge-like projection falls within a range from 1 μm to 100 μm.

17. A surface light source device of side light type according to claim 15, wherein each of said ridge-like projections runs so as to have a crossing angle not less than 60 degrees with respect to said incidence end face.

18. A surface light source device of side light type according to claim 15, wherein said emission face is further provided with light scattering pattern consisting of a plurality of scattering elements to scatter illumination light.

19. A liquid crystal display including a liquid crystal display panel and a surface light source device of side light type for illuminating said liquid crystal display panel, said surface light source device including a primary light source, a guide plate supplied with light from the primary light source and a sheet-like member, said guide plate comprising:
an emission face for light-output on which said sheet-like member is disposed;
a back face; and
an incidence end face for light-input, wherein said emission face is provided with a plurality of dome-like projections being distributed discretely and randomly on said emission face, each of which has a circular cross section and includes a blunt top portion, thereby preventing said sheet like member from sticking to said emission face and from being damaged.

20. A liquid crystal display according to claim 19, wherein each of said dome-like projections has a diameter falling within a range from 50 μm to 200 μm.

21. A surface light source device of side light type according to claim 19, wherein each of said dome-like projections has a height falling within a range from 0.1 μm to 50 μm.

22. A liquid crystal display according to claim 19, wherein said dome-like projections distribute with density such that at least one projection is allocated per box of 0.5 mm×0.5 mm.

23. A liquid crystal display according to claim 19, wherein said emission face is further provided with light scattering pattern consisting of a plurality of scattering elements to scatter illumination light.

24. A liquid crystal display including a liquid crystal display panel and a surface light source device of side light type for illuminating said liquid crystal display panel, said surface light source device including a primary light source, a guide plate supplied with light from the primary light source and a sheet-like member, said guide plate comprising:
an emission face for light-output on which said sheet-like member is disposed;
a back face; and
an incidence end face for light-input, wherein said emission face is provided with a plurality of ridge-like projections each of which includes a blunt ridge-top portion and runs crosswise with respect to said incidence end face, said blunt ridge-top portions projecting from a remainder portion which covers said emission face throughout except for where said blunt ridge-top portions are provided, thereby preventing said sheet like member from sticking to said emission face and from being damaged, wherein
a ratio of a repetition pitch of the ridge-like projections to a height of the ridge-like projections falls within a range of from 5000:1 to 1:1.

25. A liquid crystal display according to claim 24, wherein height of each ridge-like projection falls within a range from 1 μm to 100 μm.

26. A liquid crystal display according to claim 24, wherein each of said ridge-like projections runs so as to have a crossing angle not less than 60 degrees with respect to said incidence end face.

27. A liquid crystal display according to claim 24, wherein said emission face is further provided with light scattering pattern consisting of a plurality of scattering elements to scatter illumination light.

* * * * *